US005463540A

United States Patent [19]
Jones

[11] Patent Number: 5,463,540
[45] Date of Patent: Oct. 31, 1995

[54] INCANDESCENT TO FLUORESCENT LIGHT CONVERSION KIT

[75] Inventor: Roy Jones, Whittier, Calif.

[73] Assignee: CSL Lighting Mfg. Inc., Valencia, Calif.

[21] Appl. No.: 39,576

[22] Filed: Mar. 25, 1993

[51] Int. Cl.⁶ ........................................ F21S 3/00
[52] U.S. Cl. .................. 362/260; 362/216; 362/365
[58] Field of Search ................................ 362/147, 148, 362/216, 260, 364, 365, 404, 408

[56] References Cited

U.S. PATENT DOCUMENTS

| | | | |
|---|---|---|---|
| 4,520,436 | 5/1985 | McNair et al. | 362/147 X |
| 5,073,845 | 12/1991 | Aubrey | 362/260 X |
| 5,075,831 | 12/1991 | Stringer et al. | 362/147 X |

Primary Examiner—Stephen F. Husar
Attorney, Agent, or Firm—Marvin H. Kleinberg; Marshall Lenrer; Michael J. Ram

[57] ABSTRACT

A kit for replacing existing incandescent fixtures with a 2 D fluorescent fixture includes a plate with a ballast/transformer on the upper surface and a 2 D lamp socket on the lower surface. The ballast/transformer is coupled to the source of power through a separable connector which can be terminated either in an electrical plug which fits into an existing socket or, using conventional wire nut connectors, can be "hard wired" into place. Spring hangers, which can be attached to existing housing features, are loosely held to the upper surface of the plate so that in a first orientation, the plate is below the housing and access may be had to the housing interior and in a second orientation, the plate is held secure against the housing. A diffuser globe can be provided for installations which are not recessed.

6 Claims, 3 Drawing Sheets

INCANDESCENT TO FLUORESCENT LIGHT CONVERSION KIT

The present invention relates to electrical fixtures and, more particularly, a novel kit that converts existing incandescent light fixtures into energy saving, fluorescent light fixtures.

BACKGROUND OF THE INVENTION

In virtually all structures which utilize incandescent lamps for lighting, a permanent installation is made into a structural wall, including ceilings, which includes a metal receptacle which is mounted to the structure and to which is connected, usually by an armored flexible conduit, to a source of electrical power.

An electrical fixture is then mounted in the receptacle and the fixture is electrically connected to the wiring in the conduit. The fixture may be mounted wholly within the receptacle, or may extend into the room and will include conventional sockets to receive screw base incandescent lamps.

The recent patent to Troy, U.S. Pat. No. 5,083,248, shows the conversion of a recessed lighting fixture to a flush mounted fixture by using the existing receptacle or junction box in combination with a flush mounted fixture which rests against the wall or ceiling and is spring coupled to the junction box. The existing electrical socket is retained in the junction box and through extenders, can be brought to a position where it can receive the bulb of the flush mounted fixture.

Currently, converting an incandescent fixture to a fluorescent fixture utilizes assemblies that are currently available with a combination of transformer, ballast and miniature fluorescent lamp. These elements are mounted on a screw base which is adapted to fit a conventional electrical lamp socket. Because of the length of the fluorescent bulb and the diameter of the socket which includes the transformer ballast combination, such assemblies have limited utility because of space limitations. For example, such assemblies cannot fit into many recessed or flush fixtures, and are too large for many applications which enclose the bulb with a decorative globe or housing.

Commercially available miniature fluorescent lamps, sometimes known as "biaxial" lamps utilizing under 20 watts can be substituted for incandescent lamps which draw 75 watts. It will be quickly appreciated that a conversion from incandescent to fluorescent lighting, if undertaken on a sufficiently large scale, can substantially reduce the demand for electrical energy and can defer the need for increases in generating capacity by several years.

Accordingly, utility companies have undertaken programs to provide incentives to encourage conversions. However, to prevent the abuse of such incentives, it is frequently a requirement that such a conversion be "hard wired" into the structure so that less costly incandescent lamps cannot be readily substituted for the fluorescent fixtures that were required.

Typically, the conversion process requires a new or different receptacle or housing that includes wiring to a fluorescent fixture assembly. The assembly includes the transformers and ballast elements required by fluorescent bulbs. Such conversions frequently require the abandonment and removal of previously installed receptacles or junction boxes which are already wired to the main power lines and to switches.

Recently, a major lamp manufacturer, General Electric, through its GE Lighting subsidiary, introduced a fluorescent lamp under the designation "GE 2 D Compact Fluorescent Lamps". Such lamps include a central base element with a planar configuration of a continuous tube formed into two, side by side, "D" shaped components.

Depending upon the wattage, at least three, different sized units have been offered. A first or 10 w unit has the dimensions of approximately 3.6" by 3.7". A second configuration, available with either 16 or 21 watts lamps has the dimensions of 5.5" by 5.5". A third configuration, available with lamps of 28 or 38 watts, has the dimensions of 8" by 8". These units can be substituted for incandescent lamps drawing 40 to 150 watts with the same illuminating efficiency.

It would be desirable to install "2 D" lamp fixtures into existing installed receptacles or junction boxes that presently house conventional incandescent fixtures without requiring extensive time consuming manual operations by skilled electricians. It would also be desirable to have a retrofit kit that can utilize either an existing incandescent lamp socket, or existing wiring after removing the socket.

SUMMARY OF THE INVENTION

According to the present invention, a retrofit structure is provided which includes a ballast/transformer unit and a socket adapted to receive a 2 D lamp. A "quick disconnect" connector is provided between the ballast/transformer and the source of power.

The power side of the connector element may be connected to a screw base which can be installed in a conventional bulb socket. If the bulb socket is to be removed, the power wires can be cut and easily reconnected to the wires on the power side of the connector element.

Most receptacles and/or installed lamp housings permit easy removal of any installed sockets. The retrofit kit includes spring hanger elements which can connect to existing structural elements of the installed receptacle/housing. A base plate contains both the ballast/transformer and the lamp socket and is retained by the receptacle using the spring hanger elements.

In a preferred embodiment of the invention, the plate is adapted to flush mount against a wall or ceiling so that the 2 D lamp need not be recessed. A diffuser/cover can be provided to enclose the 2 D lamp and "finish" the installation.

In alternative embodiments, the plate can be recessed within the receptacle to replace a recessed incandescent lamp with a recessed fluorescent lamp of comparable brightness. As in the preferred embodiment, spring hanger elements utilize existing structural elements of the receptacle. The use of the spring hangers allows the base plate to be held at a distance from the receptacle during installation so that access can be gained to the power wires.

During the course of the installation, the power side of the connector is connected to the source of power, either through use of a screw base or by direct connection of the wires. The transformer side of the connector can then be coupled to the power side with the connector. The spring hangers can be installed in the receptacle after the electrical connections are made but before the connector elements are joined.

The plate is then supported by the spring hangers and the 2 D lamp can be placed into the socket. If a surface mount is desired, a diffuser cover can be installed. Using the spring hangers, the base plate is raised until it is flush with the surface and it will be retained in that position by the action of the spring hangers.

For new installations, a similar kit is employed together with a permanently installed housing unit which can be specially designed to cooperate with the conversion kit. Such a housing could include the power side of the connector as an integral element thereof so that the initial hook up of the power lines from the conduit can be to the connector element.

Such housing units may employ the installation system disclosed in the copending application of the present inventor which has been assigned to the assignee of the present invention, Ser. No. 07/991,111, filed Dec. 16, 1992, entitled "SPRING MOUNT FIXTURE HOUSING" and which utilizes spring clips in slots in the wall of the housing unit to engage a structural surface and to hold the housing unit in place. The sets of slots can located at different distances from the opening to accommodate a variety of structural surface thicknesses.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE DRAWINGS

Figure 1:
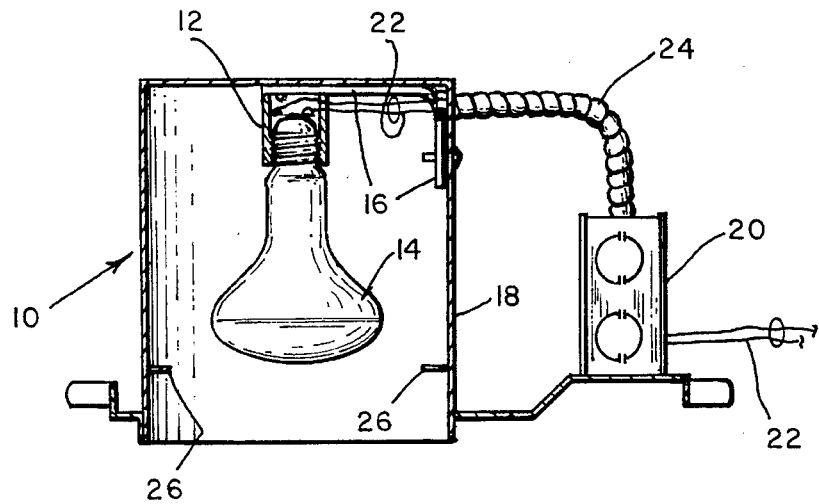
FIG. 1 is a perspective view of a prior housing equipped to utilize an incandescent lamp.

Turning first to FIG. 1, there is shown a prior art housing 10 containing a recessed incandescent lamp socket 12 containing an incandescent lamp 14. The lamp socket 12 is held on a bracket 16 which can be slidably mounted on the side wall 18 of the housing 10.

A separate junction box 20 is mounted adjacent the housing 10 and receives the electrical wiring 22 by which the lamp 14 is ultimately powered. A separate conduit 24 containing wires is then connected to the housing 10 and powers the lamp 14. As shown, the side wall 18 of the housing includes flanges 26 on opposite walls, to which various elements or accessories can be fastened.

Figure 2:
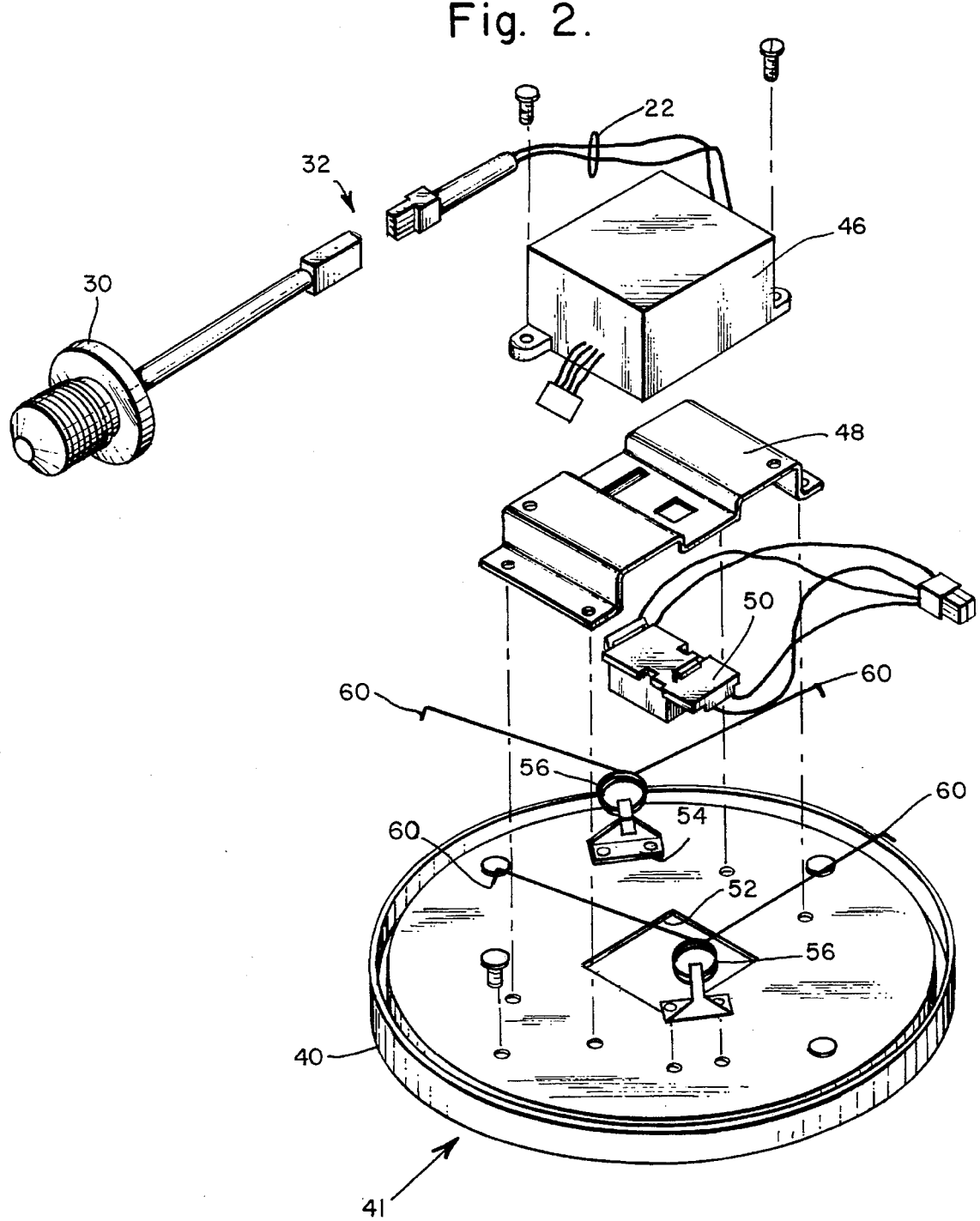
FIG. 2 is an exploded perspective view of the top of a kit element plate according to the present invention.

With reference to FIG. 2, there is shown in exploded view the conversion kit of the present invention. For example, if there is no concern about the permanence of the modification, only the lamp 14 need be removed from the housing 10. As will be seen, the modification kit can include a candelabra base 30 which can screwed into the socket 12. A one side of a separable connector 32 is joined to the base 30 while the other side is coupled to a fluorescent lamp transformer and ballast assembly as described below.

For ease in assembly, the connector 32 is separated and the base 30 can be inserted into the socket 12. The other portion of the connector 32 can be added when the base plate of the modification kit can be attached to the housing 10.

The modification kit includes a plate 40 which has an upper side 42, facing the interior of the housing 10, and a lower side 44 which faces the room to be illuminated. The connector 30 is wired to a combination ballast/transformer assembly 46 which is mounted on a standoff bracket 48.

On the underside of the standoff bracket 48, there is mounted a socket assembly 50 which is wired to the ballast transformer assembly 46 and is adapted to receive the base of a 2 D fluorescent lamp.

The plate 40 is provided with a central aperture 52 to receive the socket assembly 50 and to permit insertion of the 2 D lamp from the lower side 44 of the plate 40. At a distance from the periphery of the plate 40, corresponding to the location of the side wall 18 of the housing 10, a pair of mounting tabs 54 are fastened. A pair of coil springs 56 with extended arms 58 are loosely mounted, respectively on the pair of mounting tabs 54. At the end of each of the arms 58, there is a right angled bend 60 directed away from the opposite arm 58.

Figure 3:
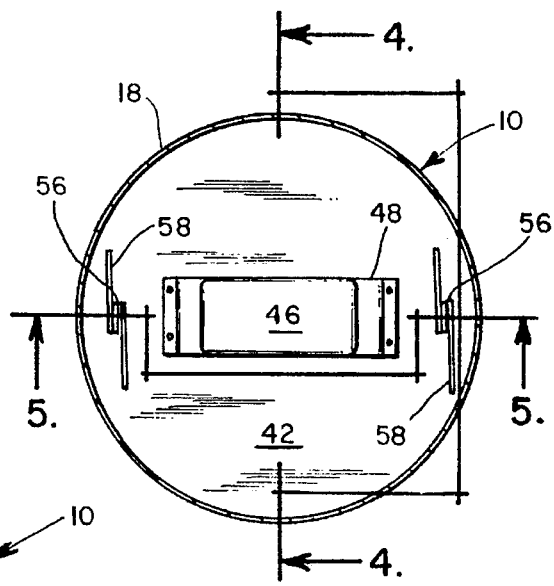
FIG. 3 is a plan view of the top of the kit element plate of FIG. 2.
Figure 4:
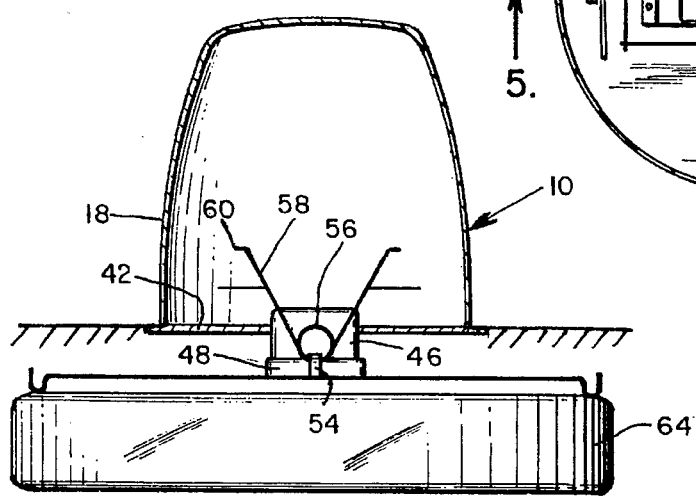
FIG. 4 is a side section view of the plate of FIG. 3 taken along line 4—4 in the direction of the appended arrows and shown inside a housing.
Figure 5:
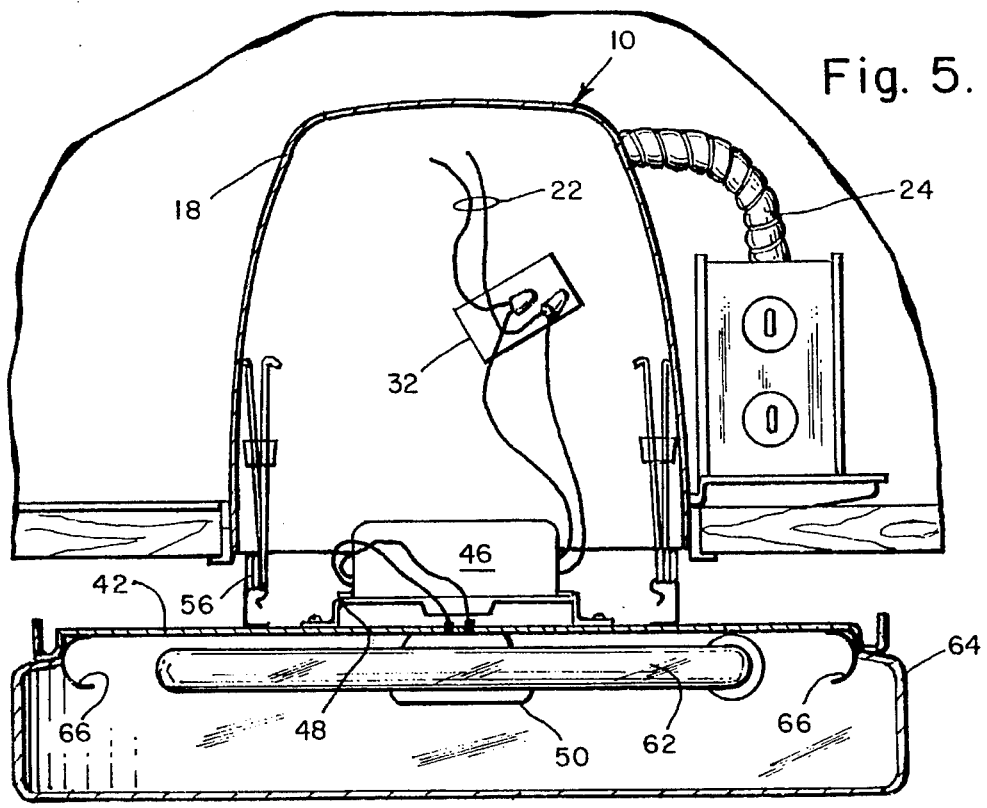
FIG. 5 is a side section view of the plate of FIG. 3 taken along line 5—5 in the direction of the appended arrows and shown inside a housing with a lamp and a decorative cover installed.

Turning to FIGS. 3–5, the conversion kit is shown inside a conventional housing 10 with the plate 40 drawn flush with the housing 10. FIG. 3 is a top view of the assembled components and FIGS. 4 and 5 are sectional views showing the relationship of the parts to each other.

In FIG. 5, a 2 D lamp 62 is inserted into the socket assembly 50. A decorative diffuser cover 64 has been added to "finish" the appearance of the fixture. For this purpose, spring clips 66 are fastened to the lower surface 44 of the plate 40, as shown in FIG. 2.

The coil springs 56 are in common use in the lighting fixture industry, primarily to releasably fasten decorative frames to recessed housings. Through the use of such springs, the frame can be lowered to replace bulbs and easily be restored to a flush mounting which is then spring loaded to stay in place. In the present invention, the coil springs cooperatively engage existing structural elements which are found in most, if not all of the presently installed housings. The installed structural elements generally have an elongated aperture into which the extended arms 58 can be inserted with the coil spring 56 compressed and the arms 58 adjacent one another.

To install the conversion assembly of the present invention, the various component elements are attached to the plate 40. Alternatively, the lamp socket 12 of the housing 10 can be utilized in conjunction with the candelabra base 30. With the connector 32 separated into its component parts, the base 30 is inserted into the socket 12.

In this configuration, the plate 40 can be held suspended below the housing 10, and can be tilted about the mounting tabs 54, thereby permitting access to the interior of the housing 10.

As the plate 40 is raised, the arms 58 move through the elongated apertures in the structural elements and begin to diverge, releasing tension on the spring 56. At some point in the travel, the restoring force tending to spread the arms 58 will be greater than the weight of the plate 40 and its contents and the plate 40 will be drawn up to be flush with the housing 10 or the surrounding surface, as shown in FIG. 4. As long as the apertures are wider than the diameter of the coil spring 56, there will be a spring tension tending to draw the plate 40 toward the structural elements.

With the plate 40 firmly in place, a 2 D lamp 62 may be installed in the socket assembly 50 and a glass or plastic diffuser cover 64 can be added to both conceal the fixture and to diffuse the illumination produced by the fixture, as shown in FIG. 5.

If the dimensions are such that the plate 40 is to be recessed into the housing 10, there may be no need for the cover, unless there is a preexisting covering which is to be retained.

Figure 6:
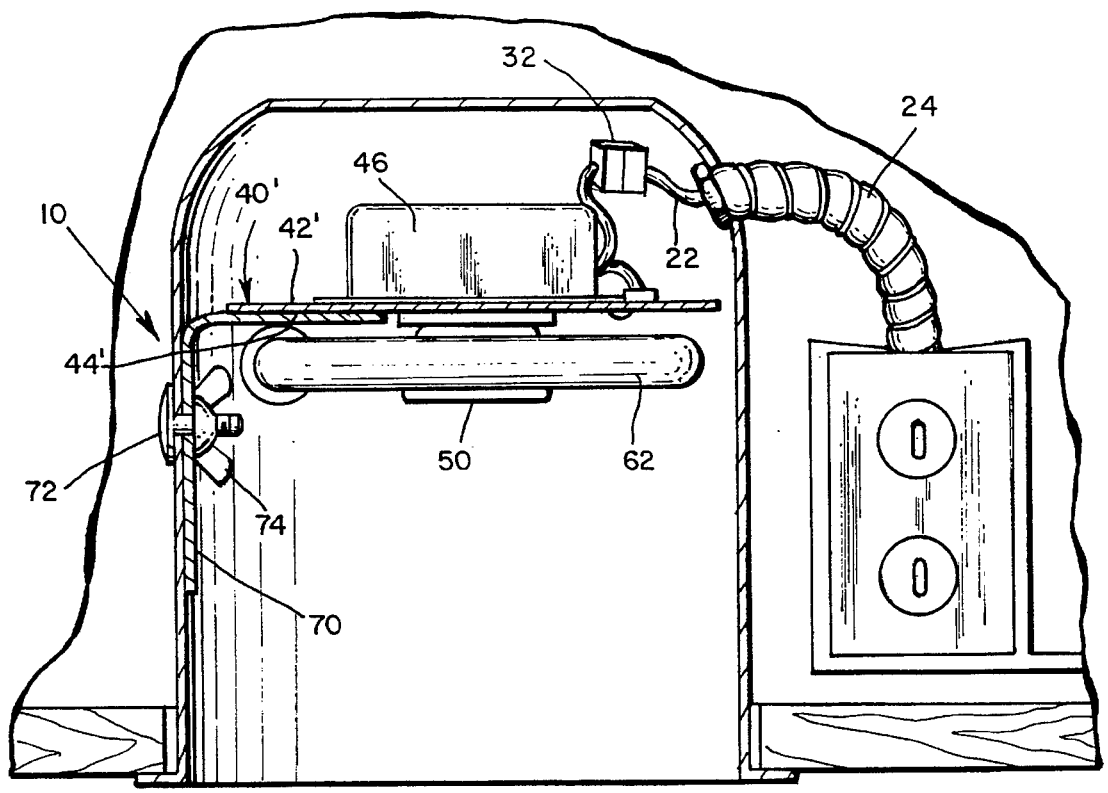
FIG. 6 is a side sectional view of a kit of the present invention installed as a recessed fixture inside a housing.

In an alternative embodiments, shown in FIG. 6, a plate 40' has fastened to it a bracket 70 with a fastener 72 such as a screw and wing nut 74 which can engage an existing the slot that normally would hold the socket bracket of the incandescent fixture. With this modification, the electrical connections can be made before the bracket 70 is fastened to the housing. If the fastener 72 has not already been installed, access to the exterior of the housing, as, for example, from above a ceiling or from an access aperture in the ceiling to available space around the housing may be required.

In such an embodiment, the spring hangers need not be supplied, since it is to be assumed that access to the housing exterior will be available should it be necessary to replace the ballast/transformer assembly. The remaining elements of the kit are substantially identical and, as can be seen, the fluorescent fixture will recessed within the housing 10. Non identical parts are indicated by reference numerals that have been primed.

It will be clear to those skilled in the art that the present invention can be used with virtually any housing or can be installed in a "new" housing that is designed to be installed in "new" construction. In such an event, the above described assembly steps would be carried out at the factory. Further, the housing would not be provided with an existing lamp socket but rather with unterminated wires. These could be terminated in a connector portion or could be connected to a pre wired connector portion.

Thus there has been shown and described an improved assembly for converting an incandescent fixture into a fluorescent fixture utilizing the new 2 D fluorescent lamp. Modular elements are used throughout employing separable connectors for all parts that require replacement. When intended for flush mounting to an existing ceiling or wall, spring hangers are used to permit access to the interior of the fixture housing. This assures that when in use, the lamp and its supporting structure remain firmly in place with respect to the housing.

What is claimed as new is:

1. Apparatus for converting an incandescent lighting fixture that is installed in a receptacle/housing, including bracket means that is installed within a ceiling, to a fluorescent fixture comprising:
   a. a base plate having an interior surface and an exterior surface;
   b. a ballast/transformer assembly mounted to said base plate interior surface;
   c. a fluorescent lamp socket mounted to said base plate exterior surface and adapted to be electrically connected to said ballast/transformer assembly;
   d. a separable connector assembly electrically coupling said ballast/transformer assembly to the permanent electrical wiring adapted to connect to the incandescent fixture; and
   e. spring hangers coupled to said base plate and adapted to attach to the receptacle/housing using existing receptacle/housing structural elements for engaging said base plate in first and second orientations, said first orientation allowing access to the interior of the receptacle/housing above said base plate and said second orientation holding said base plate secure against the receptacle/housing and blocking access to the interior of the receptacle/housing, whereby an existing receptacle housing for an incandescent light fixture can be adapted to accept a fluorescent light fixture.

2. The apparatus of claim 1, above, further including gripping means to accept a diffuser shell for enclosing said base plate and said fluorescent lamp socket.

3. The apparatus of claim 1, above, wherein said spring hangers are loosely retained within structural loops fastened to said plate interior to allow freedom of orientation of said spring hangers.

4. Apparatus for converting an incandescent lighting fixture that is installed within a receptacle/housing that is in a ceiling, to a fluorescent fixture comprising:
   a. a base plate having an interior surface and an exterior surface;
   b. a ballast/transformer assembly mounted to said base plate interior surface;
   c. a fluorescent lamp socket mounted to said base plate exterior surface and adapted to be electrically connected to said ballast/transformer assembly;
   d. a separable connector assembly electrically coupling said ballast/transformer assembly to the permanent electrical wiring adapted to connect to the incandescent fixture; and
   e. attachment means for attaching said base plate to the receptacle/housing, whereby an existing receptacle/housing for an incandescent light fixture can be adapted to accept a fluorescent light fixture.

5. The apparatus of claim 4 above, further wherein said attachment means include a strap element fastened to said base plate interior and fastening means connected to said strap element and adapted to engage an existing slot in the receptacle/housing for securing the assembly to the receptacle/housing.

6. The apparatus of claim 4 above, further wherein said attachment means include spring hangers coupled to said base plate and adapted to attach to the receptacle/housing using existing receptacle/housing structural elements for engaging said base plate in first and second orientations, said first orientation allowing access to the interior of the receptacle/housing above said base plate and said second orientation holding said base plate secure against the receptacle/housing and blocking access to the interior of the receptacle/housing.

* * * * *